(12) United States Patent
Branch (10) Patent No.: US 12,303,058 B2
(45) Date of Patent: May 20, 2025

(54) APPARATUS AND METHODS FOR COOKING SEITAN

(71) Applicant: Maurice Alexander Branch, Harvey, IL (US)

(72) Inventor: Maurice Alexander Branch, Harvey, IL (US)

(*) Notice: Subject to any disclaimer, the term of this patent is extended or adjusted under 35 U.S.C. 154(b) by 0 days.

(21) Appl. No.: 18/349,051

(22) Filed: Jul. 7, 2023

(65) Prior Publication Data

US 2024/0008672 A1 Jan. 11, 2024

Related U.S. Application Data

(62) Division of application No. 16/557,852, filed on Aug. 30, 2019, now abandoned.

(Continued)

(51) Int. Cl.
*A47J 27/18* (2006.01)
*A23L 5/10* (2016.01)
*A47J 27/10* (2006.01)

(52) U.S. Cl.
CPC ............... *A47J 27/18* (2013.01); *A23L 5/13* (2016.08); *A47J 27/10* (2013.01); *A23V 2002/00* (2013.01)

(58) Field of Classification Search
CPC ..... A21B 3/13; A23L 7/10; A23L 5/11; A23L 5/13; A23P 10/00; A23P 10/10; A23P 30/10; A47J 27/10; A47J 27/14; A47J 27/18; A47J 2027/006; A47J 37/129; A47J 37/1295; A47J 43/20; B65D 11/14;

(Continued)

(56) References Cited

U.S. PATENT DOCUMENTS 1,403,045 A 1/1922 McHugh
1,470,521 A * 10/1923 Combest ............. A47J 37/1295
                                                    220/756

(Continued)

FOREIGN PATENT DOCUMENTS

EP       0630823 A1 * 12/1994 ......... B65D 43/0214
GB       1375614 A  * 11/1974 ......... A47J 37/1228
WO    WO-2011055096 A1 *  5/2011 ............. B65D 21/08

OTHER PUBLICATIONS

Krem, Lunch 'N' Learn: Seitan, Co-Kitchen, Dec. 12, 2017 https://co-kitchen.ch/2017/12/lunch-n-learn-seitan/ (Year: 2017).*

(Continued)

*Primary Examiner* — Drew E Becker
*Assistant Examiner* — Austin Parker Taylor
(74) *Attorney, Agent, or Firm* — Foley & Lardner LLP (57) ABSTRACT

Apparatus and methods for cooking seitan and other food products are provided. An example device includes a semi-cylindrical lower portion coupled to a semi-cylindrical upper portion coupled together on one side by a hinge allowing the device to open and close. The device, in the open configuration, is structured to receive a food product such as seitan. The device can be closed around the food product, enclosing it in a cylindrical chamber. A fastener is structured to fasten the device shut on the side of the device opposite the hinge. The device has several openings allowing liquid to flow into the chamber during the cooking process. The device includes supports which allow cooking liquid to drain from the chamber.

13 Claims, 4 Drawing Sheets

Related U.S. Application Data (60) Provisional application No. 62/851,364, filed on Aug. 22, 2019.

(58) Field of Classification Search
CPC .............. B65D 7/12–20; B65D 5/4295; B65D 85/345; B65D 2205/02; B65D 7/00; B65D 7/04; B65D 7/26; B65D 7/28; B65D 11/00; B65D 11/02; B65D 11/1806
USPC ....... 220/573.1, 4.21, 4.22, 4.23, 4.24, 4.25, 220/676; 426/389, 391, 438, 496, 512; 99/426, 450
See application file for complete search history.

(56) References Cited

U.S. PATENT DOCUMENTS

| | | | |
|---|---|---|---|
| 1,497,199 A | 6/1924 | Sutthoff | |
| 2,503,490 A | 4/1950 | Janz | |
| 3,613,553 A * | 10/1971 | Popeil | A47J 37/1295 |
| | | | 99/426 |
| 3,908,535 A | 9/1975 | Gordon | |
| 4,092,909 A * | 6/1978 | Phillips | A47J 36/20 |
| | | | 99/410 |
| 5,359,924 A | 11/1994 | Roberts et al. | |
| 5,366,089 A * | 11/1994 | Parker | A45F 3/18 |
| | | | 206/549 |
| 5,617,669 A | 4/1997 | Levey | |
| 6,138,552 A * | 10/2000 | Baillieul | A47J 37/1266 |
| | | | 99/403 |
| 7,503,141 B1 | 3/2009 | Leeman | |
| 7,856,753 B2 | 12/2010 | Fisher | |
| 7,879,380 B1 | 2/2011 | Radatti et al. | |
| 9,220,371 B1 * | 12/2015 | Demirakos | A47J 37/1295 |
| 2003/0003209 A1 * | 1/2003 | Rigney | A47J 27/04 |
| | | | 426/438 |
| 2004/0099150 A1 * | 5/2004 | Staton | A23P 30/10 |
| | | | 99/440 |
| 2005/0121455 A1 | 6/2005 | Lee | |
| 2005/0235838 A1 * | 10/2005 | Cohn | A23L 5/12 |
| | | | 99/426 |
| 2006/0117963 A1 | 6/2006 | Schneider et al. | |
| 2007/0034094 A1 | 2/2007 | Tatham | |
| 2008/0110352 A1 * | 5/2008 | Lazaroff | A21B 3/155 |
| | | | 99/426 |
| 2012/0017776 A1 | 1/2012 | Banjavich | |
| 2012/0207891 A1 * | 8/2012 | Pantaleo | A23L 15/00 |
| | | | 99/403 |
| 2014/0060340 A1 | 3/2014 | Matos | |

OTHER PUBLICATIONS

Jane, Seitan Part I: Making it, The Wayward Oven, Apr. 17, 2012 http://waywardoven.blogspot.com/2012/04/seitan-part-i-making-it.html (Year: 2012).*

Jane, "Seitan Part I: Making it," The Wayward Oven, retrieved from http://waywardoven.blogspot.com/2012/04/seitan-part-i-making-it.html, 6 pages (2012).

Kremena, "Lunch 'n' learn: Seitan," Co-Kitchen, retrieved from https://co-kitchen.ch/2017/12/lunch-n-learn-seitan/, 7 pages (2017).

Non-Final Office Action for U.S. Appl. No. 16/557,852 dated Mar. 2, 2021 (13 pages).

* cited by examiner

FIG. 3

APPARATUS AND METHODS FOR COOKING SEITAN

CROSS-REFERENCE TO RELATED APPLICATIONS

This application claims benefit of priority to U.S. patent application Ser. No. 16/557,852, filed on Aug. 30, 2019, which itself claims benefit of priority to U.S. Provisional Patent Application No. 62/851,364, filed on May 22, 2019 and a corrected specification filed on Aug. 22, 2019, all the contents of which are incorporated herein by reference.

FIELD OF THE INVENTION

This application generally relates to apparatus and methods for cooking seitan and other food products.

BACKGROUND OF THE INVENTION

Seitan—also known as wheat gluten or "wheat meat"—is a vegan meat-substitute made from gluten, the main protein in wheat. When cooked, seitan takes on the look and texture of meat and can be used similarly to tofu in vegetarian and vegan dishes. Seitan "dough" is made by kneading together powdered vital wheat gluten with yeast, spices, and cooking liquid, such as water, broth, or soy sauce. Though some recipes call for baking or steaming, the most common way to cook seitan is by submersion in boiling liquid, usually a spiced broth. This allows additional flavor and moisture to absorb into the seitan. During the cooking process gas pockets form in the dough, similar to bread baking in an oven. The liquid absorption and gas pocket formation can cause the seitan to expand to two to three times its original, uncooked size.

Though some expansion is desirable, too much can cause the seitan to absorb an excess amount of liquid, causing it to become soggy and ruining the springy, meat-like texture. Uncontrolled expansion of the seitan can also result in formless, inconsistent shapes, making it impossible to cut uniform slices for serving. Several methods have been used in the past to prevent or rectify this problem. Some have suggested wrapping the raw seitan dough in plastic wrap or aluminum foil to prevent the seitan from expanding. However, this overcorrects the problem and prevents almost any of the cooking liquid from reaching the seitan and imparting flavor into the dough. Wrapping the seitan dough in cheesecloth is an alternative method which, unlike plastic wrap, allows the cooking liquid to reach the seitan dough. Aluminum foil, plastic wrap, and cheesecloth cannot produce a uniform shaped seitan, however, and none are particularly reusable.

Some recipes call for a secondary cooking step, such as sautéing or frying of the boiled seitan dough, to remove excess liquid and increase flavor. However, this adds unnecessary time to the cooking process and fails to solve the problem of inconsistent size and shape of the boiled seitan.

SUMMARY OF THE INVENTION

Embodiments herein provide a permeable vessel made up of a lower portion and an upper portion and methods of using the same that overcome the drawbacks of previously known methods for cooking seitan. In particular, the invention provides a lower portion of a vessel into which a food product such as seitan dough is placed, after which an upper portion is fastened to the lower portion to seal the vessel. The upper and lower portions each have a number of openings to allow cooking liquid to flow in and out. The fastening of the upper portion to the lower portion prevents the food product from expanding beyond the inner surfaces of the vessel, thus limiting the amount of cooking liquid that can absorb into the food product. In some cases, such as with seitan, the food product will expand until it has taken the shape of the vessel. After cooking, the food cooking apparatus is removed from the cooking liquid and excess cooking liquid is allowed to drain from the vessel.

A first set of embodiments relate to an apparatus configured for submersion in a cooking liquid. The apparatus includes an upper portion. The upper portion includes an upper outer surface, an upper inner surface defining an upper internal volume, a first plurality of openings between the upper inner surface and the upper outer surface, the first plurality of openings placing the upper outer surface in fluid communication with the upper internal volume and a fastener element. A lower portion includes a lower outer surface, a lower inner surface defining a lower internal volume, the lower internal volume and the upper internal volume defining an internal volume when the upper portion is in a closed position, a second plurality of openings between the lower inner surface and the lower outer surface, the second plurality of openings placing the lower outer surface in fluid communication with the lower internal volume, and a fastening element disposed on the lower portion, the fastening element configured to engage the complementary fastener element on the upper portion to removably secure the upper portion to the lower portion to form a combined internal volume.

A second set of embodiments relate to an apparatus configured for submersion in a cooking liquid. The apparatus includes a lower portion. A lower portion includes a lower outer surface, a lower inner surface defining an internal volume, a first plurality of openings placing the lower outer surface in fluid communication with the internal volume, and a fastening element. An upper portion includes an upper outer surface, a second plurality of openings between the upper inner surface and the upper outer surface, the second plurality of openings placing the upper outer surface in fluid communication with the internal volume, and a fastener element. The upper portion includes an upper outer surface, an upper inner surface, a second plurality of openings between the upper inner surface and the upper outer surface, the second plurality of openings placing the upper outer surface in fluid communication with the internal volume, and a fastener element. The fastening element is configured to engage the complementary fastener element on the upper portion to removably secure the upper portion to the lower portion to form a combined internal volume.

A third set of embodiments relates to a method of cooking. The method includes provided an apparatus. The apparatus includes an upper portion. The upper portion includes an upper outer surface, an upper inner surface defining an upper internal volume, a first plurality of openings between the upper inner surface and the upper outer surface, the first plurality of openings placing the upper outer surface in fluid communication with the upper internal volume and a fastener element. A lower portion includes a lower outer surface, a lower inner surface defining a lower internal volume, the lower internal volume and the upper internal volume defining an internal volume when the upper portion is in a closed position, a second plurality of openings between the lower inner surface and the lower outer surface, the second plurality of openings placing the lower outer surface in fluid communication with the lower internal volume, and a fastening element disposed on the lower portion, the fastening element configured to engage the complementary fastener element on the upper portion to removably secure the upper portion to the lower portion to form a combined internal volume. A food product is placed into the lower internal volume. The upper portion is fastened to the lower portion. The apparatus is submerged into the cooking liquid.

DETAILED DESCRIPTION

The present disclosure relates to a food cooking apparatus used to hold food in an internal volume while the food cooking apparatus is submerged in a cooking liquid. The food cooking apparatus provides improvements over current seitan cooking systems by preventing excess cooking liquid from being absorbed into the seitan dough and controlling the shape of the cooked seitan loaf. The food cooking apparatus includes a plurality of openings configured and sized to allow the cooking liquid to flow therethrough, enter the internal volume, and contact the seitan dough. The inner surfaces of the food cooking apparatus limit the expansion of the dough, preventing excess liquid from being absorbed. The food cooking apparatus is a reusable device that produces a uniform loaf that without additional cooking steps. The food cooking apparatus can be configured for home or commercial use. The repeatable, uniform cross section produced by the food cooking apparatus is especially useful in commercial settings where a standardized serving size and uniform shape are desired.

Figure 1A:
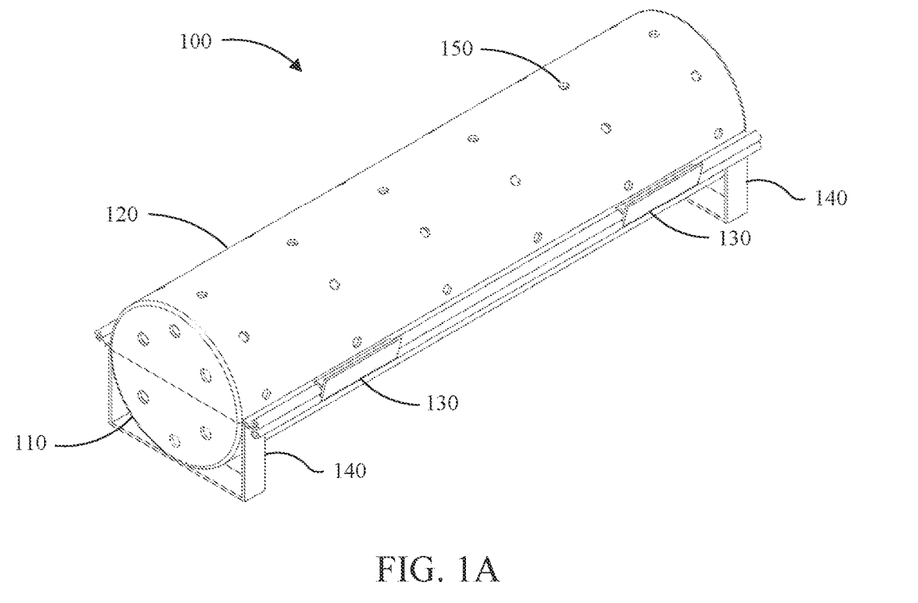
FIG. 1A is a perspective view of a food cooking apparatus in a closed configuration, according to an example embodiment.

FIG. 1A is a perspective view of a food cooking apparatus (e.g., a food cooking apparatus 100) in an open configuration (e.g., first position, first configuration, first orientation), according to an example embodiment. The food cooking apparatus 100 includes a lower portion 110 and an upper portion 120, one or more fastening elements 130 configured to fasten to complementary fastener elements 135, and supports 140. The upper portion 120 and lower portion 110 each have a plurality of openings 150 defined therealong.

Figure 1B:
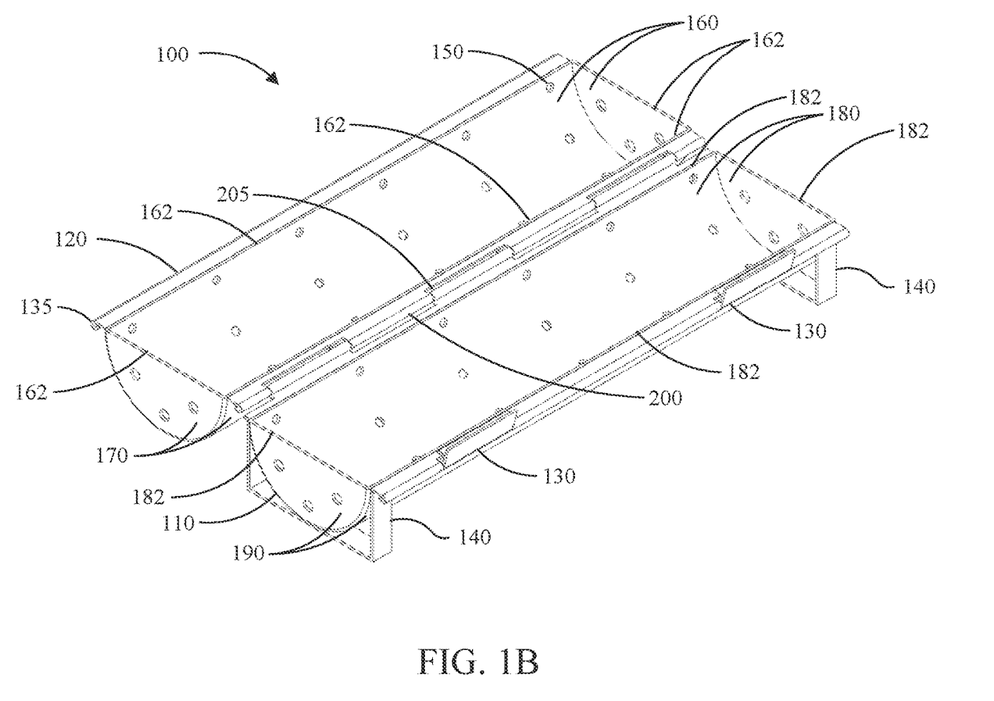
FIG. 1B is a perspective view of the food cooking apparatus of FIG. 1A in an open configuration.
Figure 2A:
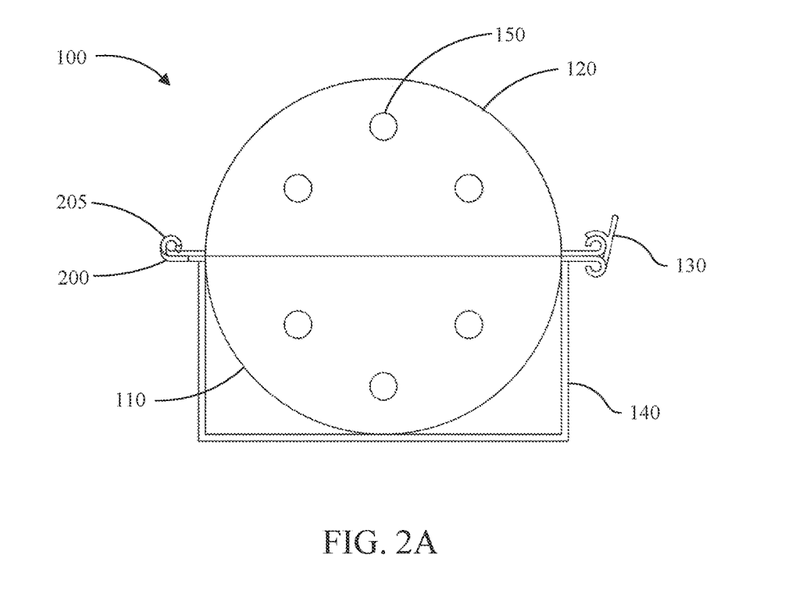
FIG. 2A is a side view of an end of the food cooking apparatus in the closed configuration of FIG. 1A.
Figure 2B:
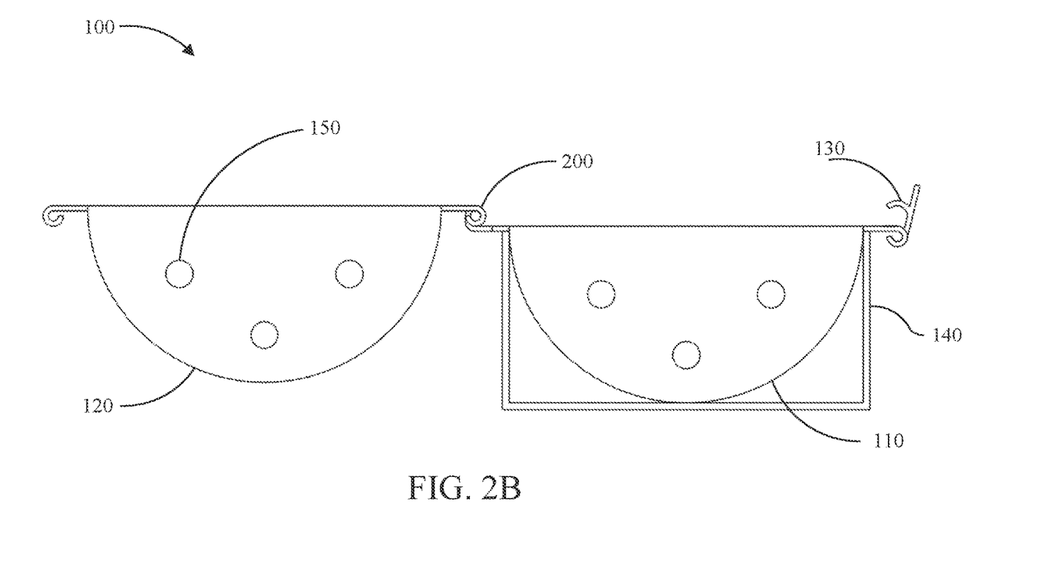
FIG. 2B is an end view of the food cooking apparatus in the open configuration of FIG. 1B.
Figure 2C:
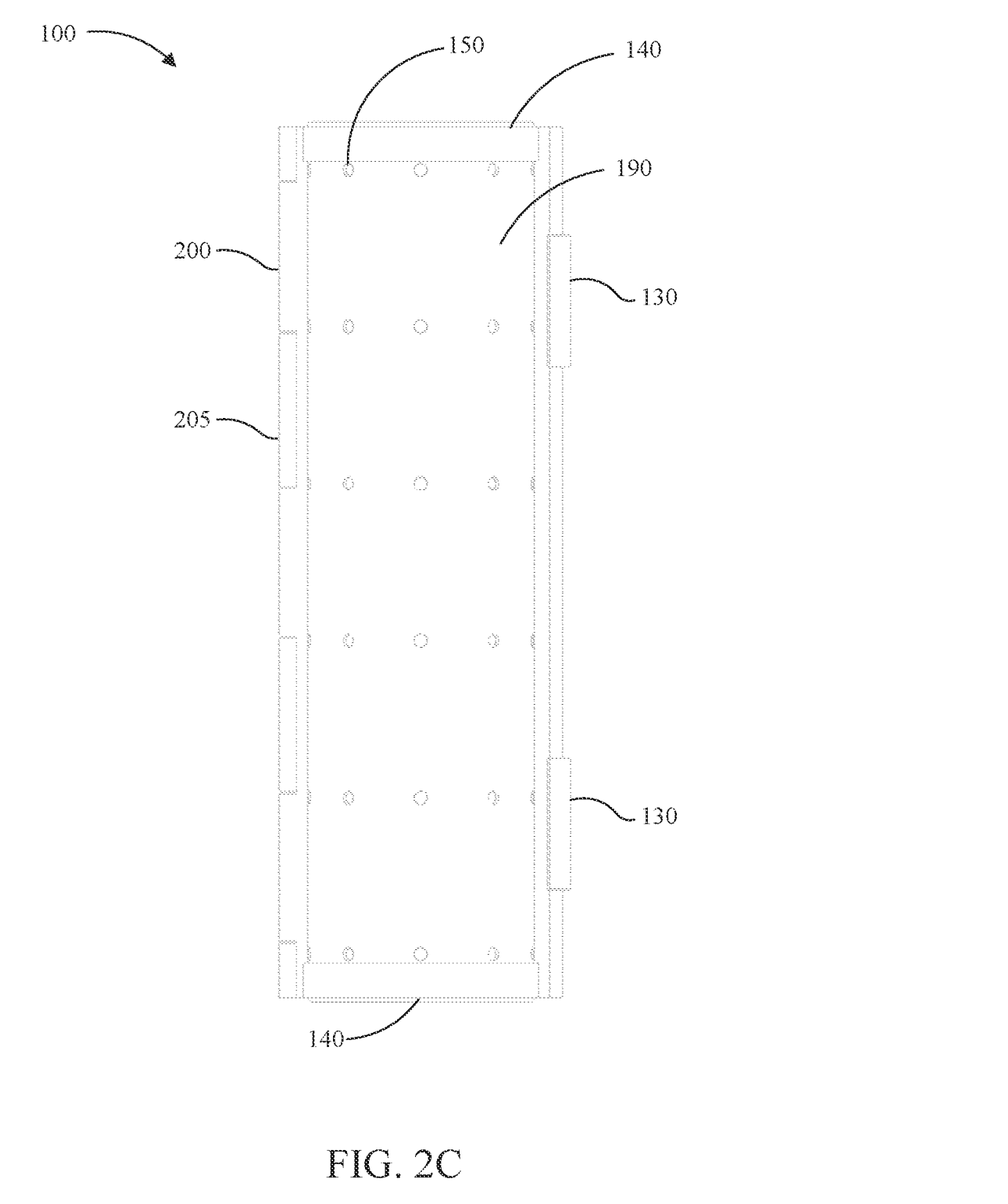
FIG. 2C is a bottom view of the food cooking apparatus in the closed configuration of FIG. 1A.

FIG. 1B is a perspective view of the food cooking apparatus 100 in an open configuration (e.g., second position, second configuration, second orientation). The lower portion 110 includes a lower inner surface 180 and a lower outer surface 190. The lower inner surface 180 defines a lower portion of the internal volume and a lower rim 182. The upper portion 120 defines an upper inner surface 160 and an upper outer surface 170. The upper inner surface 160 may define an upper portion of the internal volume and an upper rim 162 where the upper portion is not flat or convex. The upper portion 120 may have a first coupling member 200 extending from the upper outer surface 170 and the lower portion 110 may have a complementary second coupling member 205 extending from the lower outer surface 190. The first coupling member 200 is complementary to the second coupling member 205 such that the first coupling member 200 couples to the second coupling member 205. The coupling members 200, 205 couple together the lower portion 110 and the upper portion 120 such that the food cooking apparatus 100 may transition between the closed configuration and the open configuration by coupling and uncoupling the coupling members 200, 205. The first coupling member 200 and the second coupling member 205 may be coupled together by one or more hinge pins to form one or more hinges allowing the food cooking apparatus 100 to transition from an open configuration to a closed configuration. In some embodiments, the first coupling member 200 and the second coupling member 205 are fixedly coupled. In the closed position, the upper portion of the internal volume and the lower portion of the internal volume define the internal volume.

The plurality of openings 150 place the upper outer surface 170 and the lower outer surface 190 in fluid communication with an upper inner surface 160 and the lower inner surface 180, respectively. In other words, the plurality of openings 150 place the internal volume in fluid communication with the outside of the food cooking apparatus 100. In some embodiments, the plurality of openings 150 are equally spaced along the inner and outer surfaces of the upper portion 120 and the lower portion 110. For example, each opening in the plurality of openings 150 is an equal distance from adjacent openings in the lateral and radial directions. In some embodiments, the plurality of openings 150 are approximately 5 mm in diameter, with each opening in the plurality of openings 150 being positioned one-inch from adjacent openings in the plurality of openings 150. In some embodiments, the ratio of openings-to-non-openings (e.g., solid surface) for the upper outer surface 170 and/or the lower outer surface 190 is between 4 and 9, in that for each 4 to 9 square inches of solid surface, 1 square inch of openings are disposed along the food cooking apparatus 100. In one embodiment, the ratio is 5.8 to 1.

As shown in FIG. 1B, the upper 120 and lower 110 portions are each in the shape of a half-cylinder. When the upper portion 120 is fastened to the lower portion 110, the upper inner surface 160 and the lower inner surface 180 form an internal volume in the shape of a full cylinder. When a properly prepared and sized piece of seitan dough is cooked in the food cooking apparatus 100, it will take the shape of the internal volume, producing a uniform cylindrical loaf.

During use, a food product is set on the lower inner surface 180, filling some of the lower internal volume. The upper portion 120 is then attached to the lower portion 110, such that the food product is substantially enclosed in the internal volume of the food cooking apparatus 100. In some embodiments, the upper rim 162 and lower rim 182 may align, so as to form a seam that prevents any leakage of cooking liquid or food product therethrough. There may alternatively be flanges or other features that allow the food cooking apparatus 100 to seal without the upper rim 162 and lower rim 182 aligning.

The one or more fastening elements 130 engage one or more complementary fastener elements 135 to prevent the food cooking apparatus 100 from opening as the food product expands. The food cooking apparatus 100 is then submerged in cooking liquid. The openings 150 allow cooking liquid to enter the internal volume of the food cooking apparatus 100 and contact the food product. The fastening mechanism (e.g., the fastening element 130 coupled to the fastener element 135) ensures that the food cooking apparatus 100 stays closed and that the food product cannot expand beyond the lower inner surface 180 and upper inner surface 160. When the food cooking apparatus 100 is used to produce seitan, a properly prepared dough will expand to completely fill the internal volume and take on the shape of the inner surfaces.

In a preferred embodiment, the first coupling member 200 and the second coupling member 205, together with a hinge pin, form a hinge. The hinge allows the upper portion 120 to swing between an open position and a closed position. When the upper portion 120 is in the closed position, the fastening element 130 engages the fastener element 135 to fasten the food cooking apparatus 100 in the closed configuration. In some embodiments, the first coupling member 200 is a hinge, a positively charged magnet, a negatively charged magnet, pin, bolt, threaded nut, or similar fastening member with a complementary fastening element or member. Relatedly, in some embodiments, the second coupling member 205 is a hinge, a positively charged magnet, a negatively charged magnet, pin, bolt, threaded nut, or similar fastening member with a complementary fastening element or member. In some embodiments, the coupling members 200, 205 are incorporated with one or more fastening elements 130 and/or fastener element 135 such that either one or both of the first coupling member 200 and second coupling member 205 are configured to removable couple the upper portion 120 to the lower portion 110. The fastening element 130 may be a clip that latches onto the fastener element 135 which may be a lip. In alternative embodiments, the fastening element 130 and the fastener element 135 may fasten together magnetically. In another alternative embodiment, the fastening element 130 may be a screw and the fastener element 135 may be a threaded hole. In certain embodiments, the coupling members 200, 205 may be separably coupled, allowing the upper portion 120 to detach from the lower portion 110. The coupling members 200, 205 may couple together using the same fastening mechanism as fastening element 130 and fastener element 135. For example, the first coupling member 200 may be a clip and the second coupling member 205 may be a complementary lip for the clip to latch onto. The coupling members 200, 205 and the fastening and fastener elements 130, 135 are preferably disposed on opposite sides of food cooking apparatus 100.

The inner surfaces of the various possible embodiments may be configured to create a seitan loaf of a desired shape. When the internal volume forms a uniform cross section, such as in a rectangular prism or cylinder, the cooked seitan loaf will assume that shape and may be cut into uniform slices. This allows for more accurate calorie counts and uniform presentation, which can be particularly useful in commercial applications. In some embodiments, the food cooking apparatus 100 may be set on one or more supports 140 coupled to the lower outer surface 190 to allow excess cooking liquid to drain from the internal volume after cooking and in some cases prevent the food cooking apparatus 100 from rolling. The lower outer surface 190 may also be configured to allow excess liquid to drain without the use of supports. In some embodiments, the supports may cause an impression on the seitan loaf such that the outer surface of the seitan loaf has a shape and texture desirable to a consumer of the seitan loaf.

Though a cylindrical food cooking apparatus 100 is shown, other shapes are possible. Additionally, the upper portion 120 need not be symmetrical to the lower portion 110. In one embodiment, the food cooking apparatus 100 is in the shape of a hollow rectangular prism. The upper portion 120 may be symmetrical to the lower portion 110, such that the upper portion 120 and the lower portion 110 attach at the midline of the food cooking apparatus 100. In an alternative embodiment, the upper portion 120 may be flat, making up only the top surface of the prism. In this case, there will be no upper internal volume and the lower internal volume will define the totality of the internal volume. It may also be possible that the upper portion 120 is convex, rather than concave, and protrudes partially into the lower internal volume. In this case, the total internal volume of the food cooking apparatus 100 may be smaller than the lower internal volume. The possible configurations are not limited to the foregoing embodiments. Other shapes are possible as long as the upper portion 120 and lower portion 110 can be fastened together to form a substantially contained internal volume.

In another embodiment, the food cooking apparatus 100 is equipped with a hook to allow for easier placement into and removal from the cooking liquid. For example, the food cooking apparatus can be handled by the hook and hung from the lip of a cooking pot into which the food cooking apparatus 100 is lowered. The hook may remain outside the cooking liquid so the user can retrieve the food cooking apparatus 100 after cooking without draining the cooking liquid. The food cooking apparatus 100 can then be suspended by the hook to allow the excess cooking liquid to drain.

Alternative embodiments of the food cooking apparatus 100 may also be larger or smaller to allow for more or less food product to be cooked and to accommodate different cooking environments. A commercial kitchen, for example, may require a much longer food cooking apparatus 100 for use in a deep pot of cooking liquid, while a home cook may require a food cooking apparatus 100 small enough for a single serving size.

In some embodiments, the internal volume of the food cooking apparatus 100 may be separated into two or more sections by dividers to cook different food products separately from each other. For example, a divider may be shaped like a cross-section of the internal volume and contact the inner surfaces 160, 180 when the food cooking apparatus 100 is in the closed configuration. In some embodiments, the dividers are removable and may be replaced into a plurality of positions in the food cooking apparatus 100. Removable dividers may snap into predefined locations in the food cooking apparatus 100 or may clip onto the food cooking apparatus at In some cases, a user may want to cook less of the food product than may expand to fill the entire internal volume. The dividers may be used to contain the food product in a smaller section of the internal volume.

In certain embodiments, the food cooking apparatus 100 is made of aluminum, stainless steel, or glass. The various components need not be made of the same material. In some embodiments, the food cooking apparatus 100 may be configured to float in the cooking liquid when a seitan loaf has expanded to fill the internal volume. In some embodiments, the inner surfaces of the food cooking apparatus 100 may be coated in a nonstick material.

Figure 3:
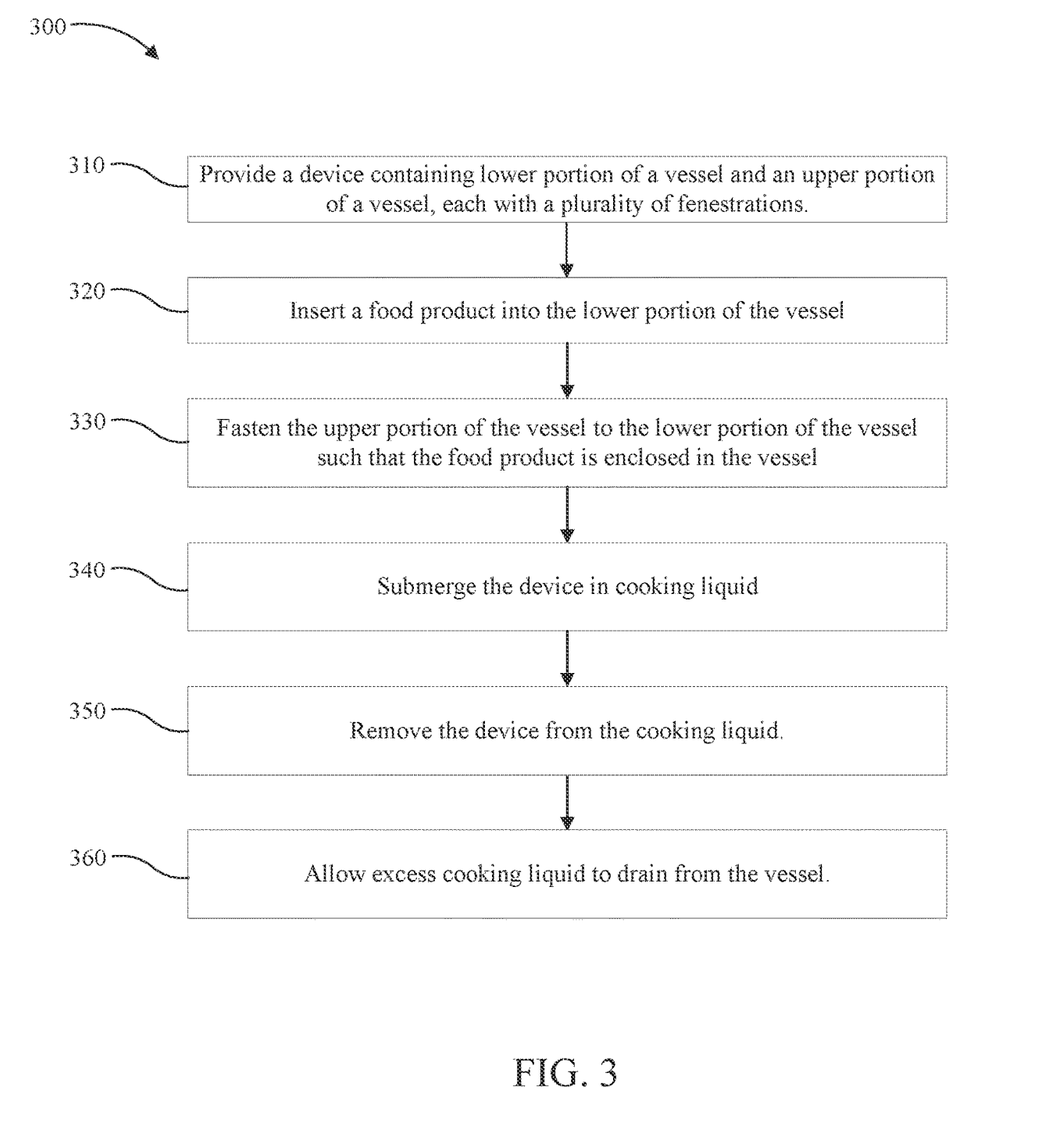
FIG. 3 is a flow diagram of a method of cooking a food product using the food cooking apparatus of FIG. 1A.

Referring to FIG. 3, a flow diagram illustrating a method 300 of using a food cooking apparatus to cook a food product is shown, according to an example embodiment. The food cooking apparatus may be the food cooking apparatus 100 of FIGS. 1A-2C.

At 310, a food cooking apparatus 100 is provided by a user. The food cooking apparatus 100 includes an upper portion 120 and a lower portion 110. For example, the food cooking apparatus 100 may be the food cooking apparatus 100 of FIGS. 1A-2C and the upper and lower portions may be the upper portion 120 and the lower portion 110 portions of the food cooking apparatus 100.

At 320, a food product is placed into the lower portion 110. In some embodiments, the food product will be seitan dough. In some embodiments, dividers are placed along the inner surfaces 160, 180 separating the internal volume into different sections. In some cases, the dividers can be used to reduce the volume in which the food product in contained. In other cases, different food products may be placed into the different sections. In some embodiments, it may be advantageous to remove the food cooking apparatus 100 in the middle of cooking to place a different food product in an empty section to accommodate differences in cooking times.

At 330, the upper portion 120 is fastened to the lower portion 110, enclosing the food (e.g., seitan dough, vegetables, etc.) inside the internal volume. One or more fastening elements 130 is used to prevent the upper portion 120 and the lower portion 110 from separating as the food product expands during cooking. In certain embodiments, the upper portion 120 and lower portion 110 are attached on one side with a hinge allowing the user to swing the upper portion 120 over the lower portion 110 and fasten them together on the other side of the apparatus 100. In other embodiments, the upper portion 120 may be fully separable from the lower portion 110. In those embodiments, additional fastening elements 130 and fastener elements 135 may be employed to couple both sides of the upper portion 120 to the lower portion 110.

At 340, the user submerges the food cooking apparatus 100 in cooking liquid. The cooking liquid may be water, broth, oil, or similar liquid that can flow into the internal volume through the openings 150 and contact the food product. Certain food products, such as seitan, will expand while the food cooking apparatus 100 is submerged. The fastening of the upper portion 120 the lower portion 110 will prevent the food product from expanding beyond the inner surfaces 160 and 180. Certain food products, such as seitan, may expand to fill the entire internal volume and will take on the shape of the inner surfaces 160 and 180.

At 350, the user removes the food cooking apparatus 100 from the cooking liquid.

At 360, excess cooking liquid in the internal volume is allowed to drain out through the openings 150. In some embodiments, the food cooking apparatus 100 will be placed on one or more supports 140 to allow the excess liquid to drain. In other embodiments, the configuration of the lower portion 110 will be configured such that the excess liquid can drain out without the need for supports 140.

Though in the preferred method 300 the food cooking apparatus 100 is used to cook seitan, other food products may be cooked as well. For example, the method 300 may be used to cook pasta, vegetables, or other boilable or friable food products. In embodiments in which the food cooking apparatus 100 has dividers, different food products may be in the various sections of the internal volume. For example, one section of the internal volume could be used to cook seitan while the other is used to cook pasta or vegetables. The food cooking apparatus 100 may be removed from the cooking liquid at various times during the cooking process to fill different sections to accommodate differences in cooking times.

It should be understood that no claim element herein is to be construed under the provisions of 35 U.S.C. § 112(f), unless the element is expressly recited using the phrase "means for." The method schematic diagram described above is generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment," "an embodiment," "an example embodiment," or similar language means that a particular feature, structure, or characteristic described in connection with the embodiment is included in at least one embodiment of the present invention. Thus, appearances of the phrases "in one embodiment," "in an embodiment," "in an example embodiment," and similar language throughout this specification may, but do not necessarily, all refer to the same embodiment.

Additionally, the format and symbols employed are provided to explain the logical steps of the schematic diagram and are understood not to limit the scope of the methods illustrated by the diagram. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed:

1. A method of preparing food comprising:
   pivoting an upper portion of an apparatus about a hinge relative to a lower portion of the apparatus;
   placing an uncooked seitan loaf onto a lower internal volume defined by the lower portion;
   pivoting the upper portion about the hinge to close the apparatus and define a combined internal volume of the apparatus by the upper portion and the lower portion, with the uncooked seitan loaf disposed within the apparatus;
   fastening the upper portion to the lower portion;
   submerging the apparatus in a cooking liquid;
   flowing the cooking liquid into the combined internal volume;
   cooking the uncooked seitan loaf into cooked seitan loaf;
   ascertaining that the apparatus is floating before removing the apparatus from the cooking liquid; and
   the method further comprises:

before placing the uncooked seitan loaf into the lower internal volume, inserting a removable divider across a cross-section of the lower internal volume extending upward toward an upper internal volume of the upper portion and separating the combined internal volume into at least a first section and a second section, wherein placing the uncooked seitan loaf into the lower internal volume comprises placing the uncooked seitan loaf into the first section of the different sections of the combined internal volume, after submerging the apparatus in the cooking liquid and before cooking the uncooked seitan loaf into the cooked seitan loaf, removing the apparatus from the cooking liquid, after removing the apparatus from the cooking liquid, placing a food item different from the uncooked seitan loaf into the second section of the different sections of the combined internal volume, the second section separated from the first section by the removable divider, and after placing the food item into the second section of the different sections of the combined internal volume, submerging the apparatus in the cooking liquid.

2. The method of claim 1, further comprising, after cooking, removing the apparatus from the cooking liquid and allowing excess cooking liquid to drain from the combined internal volume.

3. The method of claim 1, further comprising allowing excess cooking liquid to drain from the combined internal volume by setting the apparatus on one or more supports coupled to the lower portion.

4. The method of claim 1, further comprising adding a non-stick material to the combined internal volume before placing the uncooked seitan loaf in the lower internal volume.

5. The method of claim 1, wherein the apparatus further comprises a hook and wherein, after fastening the upper portion to the lower portion, hanging the apparatus from a lip of a cooking pot by the hook.

6. The method of claim 1, wherein the cooking liquid comprises at least one of water, broth, or oil.

7. A method of cooking comprising:
 providing an apparatus comprising:
  an upper portion comprising:
   an upper outer surface,
   an upper inner surface defining an upper internal volume,
   a first plurality of openings extending from the upper outer surface through the upper inner surface, the first plurality of openings placing the upper outer surface in fluid communication with the upper internal volume,
   an upper rim disposed at an edge of the upper inner surface, the upper rim comprises a length equal to a length of the upper portion,
   the upper portion having an upper solid area defined by an area of the upper inner surface less an area of the first plurality of openings and an upper portion opening area defined by a total area of the first plurality of openings, a ratio of the upper solid area to upper opening area between 4:1 and 9:1, and
   a fastener element; and
  a lower portion comprising:
   a lower outer surface,
   a lower inner surface defining a lower internal volume, the lower internal volume and the upper internal volume defining an enclosed internal volume when the upper portion is in a closed position,
   a second plurality of openings extending from the lower outer surface through the lower inner surface, the second plurality of openings placing the lower outer surface in fluid communication with the lower internal volume,
   a lower rim disposed at an edge of the lower inner surface, the lower rim forms a seam with the upper rim when the upper portion is in the closed position,
   the lower portion having a lower solid area defined by an area of the lower inner surface less an area of the second plurality of openings and a lower portion opening area defined by a total area of the second plurality of openings, a ratio of the lower solid area to lower opening area being between 4:1 and 9:1, and
   a fastening element disposed on the lower portion, the fastening element configured to engage the fastener element on the upper portion to removably secure the upper portion to the lower portion to form a combined internal volume;
 placing a first food product into the lower internal volume;
 fastening the upper portion to the lower portion;
 submerging the apparatus in a cooking liquid;
 ascertaining that the apparatus is floating before removing the apparatus from the cooking liquid; and
 the method further comprises:
  before placing the first food product into the lower internal volume, inserting a removable divider across a cross-section of the lower internal volume extending upward toward an upper internal volume of the upper portion and separating the combined internal volume into at least a first section and a second section, wherein placing the first food product into the lower internal volume comprises placing the first food product into the first section of the different sections of the combined internal volume,
  after submerging the apparatus in the cooking liquid and before cooking the first food product, removing the apparatus from the cooking liquid,
  after removing the apparatus from the cooking liquid, placing a second food product different from the first food product into the second section of the different sections of the combined internal volume, the second section separated from the first section by the removable divider, and after placing the second food product into the second section of the different sections of the combined internal volume, submerging the apparatus in the cooking liquid.

8. The method of claim 7, further comprising removing the apparatus from the cooking liquid and allowing excess cooking liquid to drain from the combined internal volume.

9. The method of claim 7, further comprising allowing excess cooking liquid to drain from the combined internal volume by setting the apparatus on one or more supports coupled to the lower portion.

10. A method of cooking comprising:
 providing an apparatus comprising:
  an upper portion comprising:
   an upper outer surface,
   an upper inner surface defining an upper internal volume,
   a first plurality of openings extending from the upper outer surface through the upper inner surface, the first plurality of openings placing the upper outer surface in fluid communication with the upper internal volume, an upper rim disposed at an edge of the upper inner surface, and a fastener element; and a lower portion comprising:

a lower outer surface, a lower inner surface defining a lower internal volume, the lower internal volume and the upper internal volume defining an enclosed internal volume when the upper portion is in a closed position, a second plurality of openings extending from the lower outer surface through the lower inner surface, the second plurality of openings placing the lower outer surface in fluid communication with the lower internal volume, a lower rim disposed at an edge of the lower inner surface, the lower rim forms a seam with the upper rim when the upper portion is in the closed position, and a fastening element disposed on the lower portion, the fastening element configured to engage the fastener element on the upper portion to removably secure the upper portion to the lower portion to form a combined internal volume;

placing a first food product into the lower internal volume;

fastening the upper portion to the lower portion;

submerging the apparatus in a cooking liquid;

ascertaining that the apparatus is floating before removing the apparatus from the cooking liquid; and the method further comprises:

before placing the first food product into the lower internal volume, inserting a removable divider across a cross-section of the lower internal volume extending upward toward an upper internal volume of the upper portion and separating the combined internal volume into at least a first section and a second section, wherein placing the first food product into the lower internal volume comprises placing the first food product into the first section of the different sections of the combined internal volume, after submerging the apparatus in the cooking liquid and before cooking the first food product, removing the apparatus from the cooking liquid, after removing the apparatus from the cooking liquid, placing a second food product different from the first food product into the second section of the different sections of the combined internal volume, the second section separated from the first section by the removable divider, and after placing the second food product into the second section of the different sections of the combined internal volume, submerging the apparatus in the cooking liquid.

11. The method of claim 10, wherein the fastening element on the upper portion is a clip and the fastener element on the lower portion is a lip and the method further comprises latching the clip to the lip.

12. The method of claim 10, wherein the fastener element and the fastening element are magnets and the method further comprises fastening the upper portion to the lower portion magnetically.

13. The method of claim 10, wherein the fastening element on the upper portion is a first screw and the fastener element on the lower portion is a first threaded hole and the method further comprises fastening the upper portion to the lower portion by way of screwing the first screw into the first threaded hole and screwing a second screw into a second threaded hole.

* * * * *